(12) United States Patent
Glass (10) Patent No.: US 7,724,848 B2
(45) Date of Patent: May 25, 2010

(54) PREDICTIVE SIGNAL CANCELLATION FOR EXTRACTING 1 MB/S MIL-STD-1553 COMPONENT FROM COMPOSITE HIGH PERFORMANCE 1553 SIGNAL

(75) Inventor: Michael Glass, Farmingville, NY (US)

(73) Assignee: Data Device Corporation, Bohemia, NY (US)

( * ) Notice: Subject to any disclaimer, the term of this patent is extended or adjusted under 35 U.S.C. 154(b) by 922 days.

(21) Appl. No.: 11/491,459

(22) Filed: Jul. 21, 2006

(65) Prior Publication Data

US 2007/0291881 A1 Dec. 20, 2007

Related U.S. Application Data

(60) Provisional application No. 60/702,650, filed on Jul. 26, 2005.

(51) Int. Cl.
*H04B 1/10* (2006.01)
(52) U.S. Cl. ........................................ 375/346; 375/340
(58) Field of Classification Search ................. 375/340, 375/346, 349, 350
See application file for complete search history.

(56) References Cited

U.S. PATENT DOCUMENTS 7,218,357 B2 * 5/2007 Kim et al. .................... 348/607

* cited by examiner

*Primary Examiner*—David B Lugo
(74) *Attorney, Agent, or Firm*—Volpe and Koenig P.C.

(57) ABSTRACT

Method and apparatus for maximizing the usable bandwidth for High Performance 1553 terminals operating concurrently on the same physical bus with legacy 1 Mb/s MIL-STD-1553 terminals. More specifically, the method and apparatus provides implementation for predictive cancellation by synthesizing an estimate of the 1 Mb/s MIL-STD-1553 component of a composite 1 Mb/s plus High Performance 1553 input signal using either of two different techniques: (1) a combination of digital and analog techniques; and (2) an all digital technique. The synthesized signal is then subtracted from the composite signal. Both techniques employ an algorithm for minimizing the effects of clock skew between 1 Mb/s 1553 transmitting clocks and the local High Performance 1553 sampling clock. Both techniques also incorporate an adaptation algorithm for developing and maintaining digital models of 1 Mb/s 1553 signals received from multiple 1 Mb/s 1553 terminals on a bus.

30 Claims, 7 Drawing Sheets

PREDICTIVE SIGNAL CANCELLATION FOR EXTRACTING 1 MB/S MIL-STD-1553 COMPONENT FROM COMPOSITE HIGH PERFORMANCE 1553 SIGNAL

This application claims priority from U.S. provisional application No. 60/702,650 filed on Jul. 26, 2005, which is incorporated by reference as if fully set forth.

The present invention generally relates to the field of military avionics data buses. More specifically, the invention relates to maximizing the usable signal and data bandwidth for extended bandwidth High Performance 1553 terminals operating concurrently with legacy 1 Mb/s MIL-STD-1553 terminals on the same data bus.

BACKGROUND ON THE INVENTION

For several decades, MIL-STD-1553 has served as the workhorse networking standard for the integration of military/aerospace avionics platforms. MIL-STD-1553's 1 Mb/s data rate and allowance for up to 31 remote terminals robustly supports traditional command and control applications for military avionics, and has served the industry well for many years. However, contemporary avionics applications result in increasing demand for network bandwidth and scalability beyond 1 Mb/s. In addition to command and control, these applications include processor and DSP clusters, digitized sensor interfacing, displays, file transfers, and data storage.

For new military aircraft, high-speed networking standards such as Fibre Channel, Gigabit Ethernet, and IEEE 1394 (FireWire) are being employed as a means of achieving higher data rates and wider connectivity. However, for the U.S. Department of Defense's (DoD's) large fleet of legacy aircraft, migration to newer networking standards necessitates extensive re-wiring of network cables and couplers, which generally entails a prohibitively high cost. As a result, there is a clear need to be able transmit higher data rates over the existing MIL-STD-1553 cable infrastucture.

By leveraging modern telecommunication modulation techniques, it is possible to transmit significantly higher data rates, on the order of hundreds of megahertz, over existing 1553 buses. Such methodologies are termed "Extended Bandwidth 1553" or "High Performance 1553" High Performance 1553. Hereafter, this document uses the designation "High Performance 1553." While some subsystems will benefit greatly by migrating to higher data rates, there will also be many other subsystems on existing 1553 buses that do not require higher bandwidth. These systems will need to continue using 1 Mb/s MIL-STD-1553 signaling, while co-existing with the higher speed traffic on the same buses.

In order to transmit higher data rates over legacy MIL-STD-1553 cable plants, a number of issues need to be addressed. These include channel bandwidth capacity, electromagnetic interference (EMI) constraints, noise, and the presence of 1 Mb/s MIL-STD-1553 signals. Channel capacity is the result of bandwidth limitations of legacy 1553 cables, stubs, and couplers. Signal level limitations are the result of MIL-STD-461 EMI constraints; the presence of 1 Mb/s 1553 signals compounds this by further reducing the allowable High Performance 1553 signal level. Sources of noise include transmitters and receivers connected to a multi-drop 1553 bus, as well as conducted and radiated transients from various external sources.

This invention deals with embodiments of two different methodologies for receiving High Performance 1553 signals in the presence of concurrent 1 Mb/s MIL-STD-1553 signals being transmitted over the same data bus. The problem encountered results from the fact that the frequency spectrum for legacy MIL-STD-1553 signals extends significantly beyond the fundamental frequency of 1 MHz. There are multiple approaches for dealing with this problem, with each having with its advantages and disadvantages. Four possible approaches include:

As a means of limiting harmonic content above 1 MHz, low pass filters are installed in-line with all legacy 1553 transmitters. However, there are significant cost and logistics issues associated with this proposed implementation.

Positioning the High Performance 1553 signal bandwidth to a frequency band above which there is no significant MIL-STD-1553 signal content. A drawback of this approach is that precludes a major portion of spectrum which has relatively strong channel response for use by High Performance 1553 signals.

The High Performance 1553 signal may be transmitted over the redundant bus; i.e., the bus that is not currently being used by legacy 1553 signals. However, this technique may result in degraded performance if one of the dual redundant buses fails.

A predictive cancellation methodology for receiving High Performance 1553 signals in the presence of concurrent MIL-STD-1553 signals. The goal of the cancellation is to remove the 1 Mb/s MIL-STD-1553 signal from the composite input signal. Predictive cancellation allows for reception of High Performance 1553 signals with concurrent MIL-STD-1553 signals, without necessitating the sacrifice of significant amounts of High Performance 1553 signal bandwidth.

SUMMARY OF INVENTION

Figure 1:
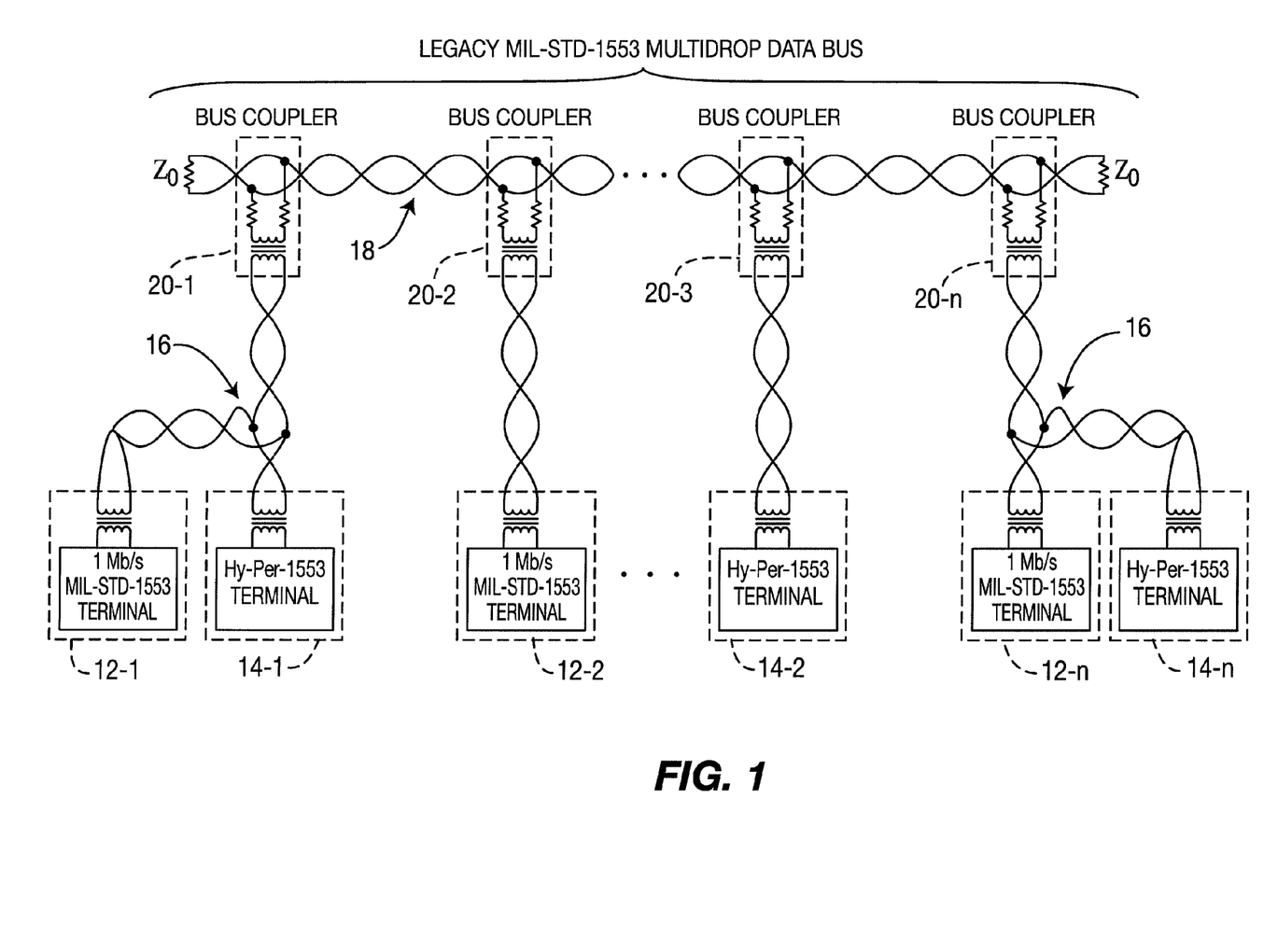
FIG. 1 is simplified schematic showing a plurality of remote terminals (RTs) coupled to a data bus.

FIG. 1 illustrates an example of a legacy multi-drop MIL-STD-1553 bus system 10 having a mix of 1 Mb/s MIL-STD-1553 terminals 12-1 to 12-$h$ and High Performance 1553 terminals 14-1 to 14-$h$. In two cases, there are 1 Mb/s MIL-STD-1553 and High Performance 1553 terminals which share the same 1553 stub cable 16. Each of the terminals 12, 14 are coupled to a common 1553 bus 18 by bus couplers 20-1 20-$n$.

The presence of MIL-STD-1553 and High Performance 1553 terminals on the same bus results in situations involving composite waveforms which include both 1 Mb/s and High Performance 1553 components. This invention provides method and apparatus for High Performance 1553 receivers to subtract out, rather than filter out, the 1 Mb/s MIL-STD-1553 signals from the composite signal. One method embodiment employs a combination of analog and digital techniques, the actual subtraction for implementing predictive cancellation being performed in the analog domain, rather than digitally. The digital subtraction embodiment uses all digital techniques for detecting reception of a 1 Mb/s signal as well as digital reconstruction of an estimate of the MIL-STD-1553 waveform.

In the analog subtraction technique, the reconstructed waveform is then converted to an analog signal which is subtracted out from the composite received signal, and then digitized. With the digital subtraction technique, this subtraction operation is performed purely in the digital domain. With either method, during periods of simultaneous MIL-STD-1553 and High Performance 1553 signal reception, the 1 Mb/s MIL-STD-1553 signal is very nearly eliminated from the resultant difference signal, leaving mainly the High Performance 1553 signal.

The techniques described employ conventional techniques for detecting reception of a 1 Mb/s signal, along with the digital reconstruction of an estimate of the MIL-STD-1553 waveform. The reconstructed waveform is then converted to an analog signal which is subtracted out from the composite received signal. During periods of simultaneous MIL-STD-1553 and High Performance 1553 signal reception, the 1 Mb/s MIL-STD-1553 signal is very nearly eliminated from the resultant difference signal, leaving mainly the High Performance 1553 signal.

The methodology described also includes an adaptation algorithm, which provides a "learning mode" that operates during periods of time when a 1 Mb/s 1553 signal, but no High Performance 1553 signal, is being received. In this mode, the MIL-STD-1553 waveform reconstruction model is "tuned" for optimal operation.

BRIEF DESCRIPTION OF THE FIGURES

FIG. 5b shows waveforms useful in describing the circuitry of FIG. 5a.

DETAILED DESCRIPTION OF THE INVENTION

The theoretical maximum capacity of a communication channel is given by equation [1], the Shannon equation:

$$C = W \times \text{Log}_2(1 + S/N) \quad [1]$$

where:
C=the channel's maximum capacity, the bits per second
S=the signal level at the receiver, in RMS volts
N=the level of white Gaussian noise at the receiver, in RMS volts
W=the bandwidth of the signal, in Hertz For the case where the signal and noise levels vary as a function of frequency over a frequency range of $f_1$ to $f_2$, the modified form of Shannon's capacity equation is given by equation [2].

$$C = \int_{f_1}^{f_2} \text{Log}_2(1 + S(f)/N(f)) df \quad [2]$$

Figure 2:
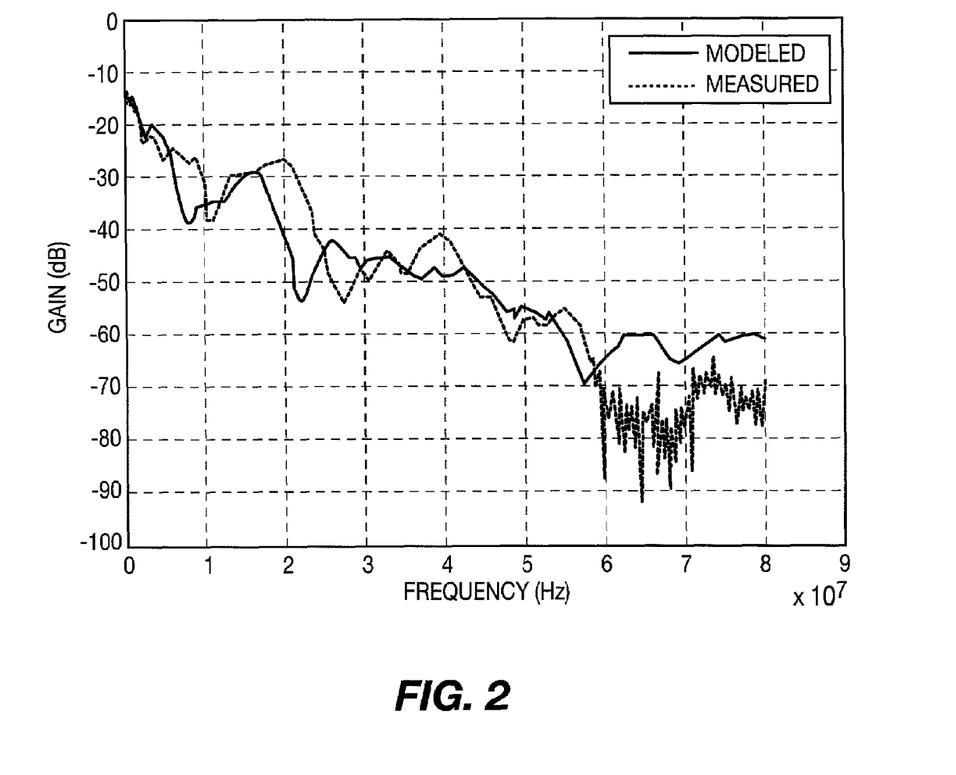
FIG. 2 shows plots of modeled and measured responses plotting gain vs. frequency.

FIG. 2 illustrates the modeled and measured channel response of a MIL-STD-1553 bus from DC to 80 MHz. The indicated high frequency attenuation is attributable to bus cable, coupling transformers, and stub loading. As a result, for the purpose of maximizing channel data rate, the "prime real estate" area of frequency spectrum is in the lower portion of the range.

1 Mb/s MIL-STD-1553 Signal Spectrum

Figure 3A:
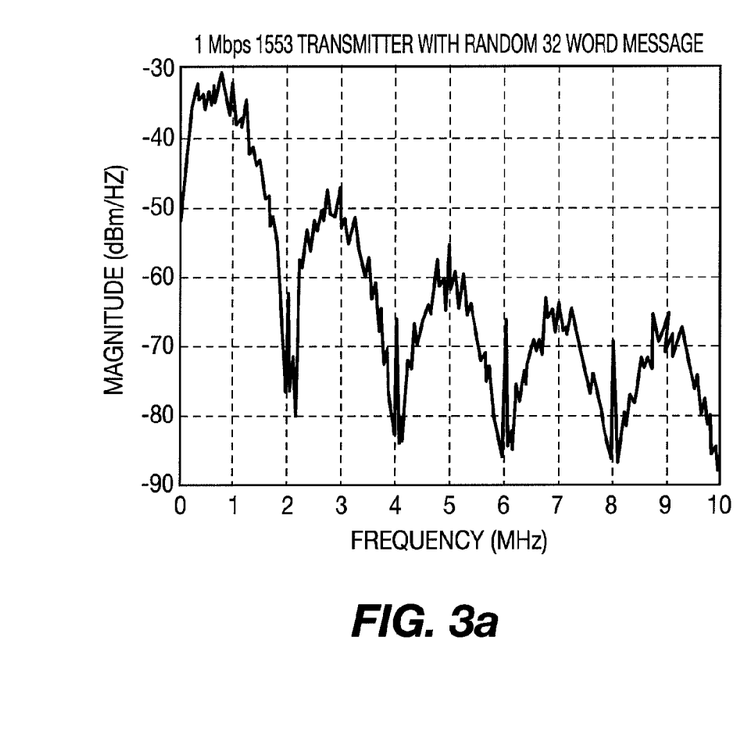
FIGS. 3a and 3b respectively show the frequency spectrum of a 1 Mb/s-STD-1553 signal over a 10 MHZ and a 150 MHZ range.
Figure 3B:
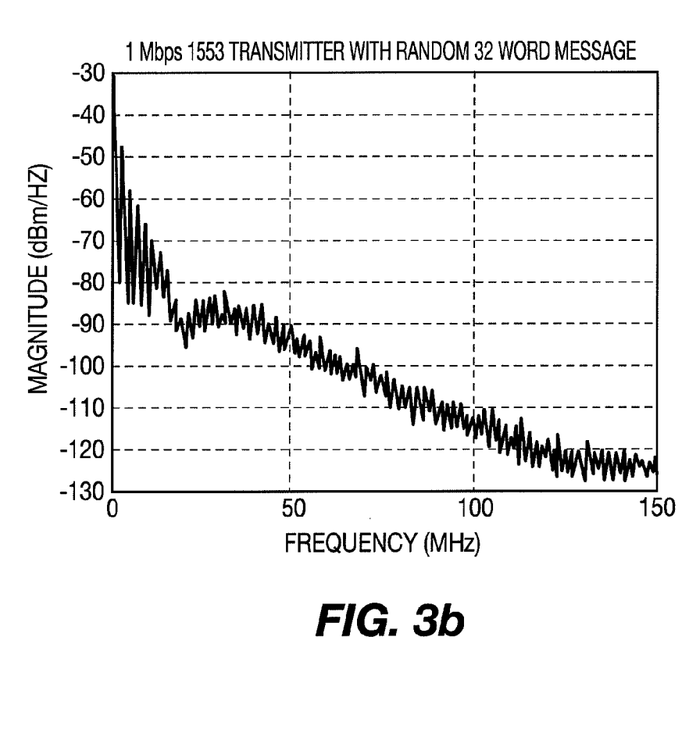

FIGS. 3a and 3b illustrate the frequency spectrum for the signaling of a MIL-STD-1553 message, shown for the case of a 32-word message with random data, over a frequency range 0-10 MHz (FIG. 3a) and 0-150 MHz (FIG. 3b). As shown, for 1553's 1 Mb/s Manchester bi-phase (2 Mbaud) encoded data, the peak amplitude is in the range of the fundamental frequencies 500 KHz and 1 MHz (note especially FIG. 3a). Nevertheless, there is still significant energy contained in the odd harmonics above 1 MHz.

Referring again to FIG. 2, it can be seen that in terms of a candidate frequency spectrum for High Performance 1553, the band with the lowest channel attenuation is that region below 20 MHz. Unfortunately, this is also the band containing the highest levels of harmonic energy form the 1 Mb/s MIL-STD-1553 signal. The encroachment by the legacy 1553 signal significantly reduces the amount of usable spectrum for High Performance 1553 signaling.

Therefore, in order to maximize the available High Performance 1553 frequency spectrum and thus the data rate during concurrent operation, it is necessary to minimize or eliminate the effects of the 1 Mb/s 1553 signal. In a High Performance 1553 receiver, the amplitudes of the 1 Mb/s 1553 signal harmonics can be significantly reduced by high-pass filtering the composite (1553+High Performance 1553) signal. This however, has the unfortunate effect of also reducing the amplitude of the High Performance 1553 signal.

Instead of employing filtering to remove the harmonics of the 1 Mb/s signal, the method which is the subject of this invention is predictive cancellation. That is, this technique removes the 1 Mb/s signal harmonics from the composite signal by means of subtraction rather than filtering.

Predictive Signal Cancellation

Fundamentally, the method of the present invention digitally synthesizes the 1 Mb/s 1553 signal based on detected zero crossings of that signal. The synthesized signal is then subtracted out from the composite (1 Mb/s 1553+High Performance 1553) signal. Two methods for performing the subtraction operation are: (1) in the analog domain; and (2) in the digital domain.

Processing signals purely in the digital domain presents a number of advantages including algorithm flexibility, relative simplicity for dealing with time delays, and minimizing the effects of analog circuit drifts. With this alternative, it is necessary to digitize the composite received signal, as will be set forth below.

For concurrent operation, the components of the composite received signal include the 1 Mb/s 1553 component which typically has a signal level on the order of volts, along with the High Performance 1553 component of the signal, which can have a level on the order of millivolts. The resulting digitized difference signal is processed further in order to extract the High Performance 1553 bit stream, as will be described making reference to FIG. 7.

Figure 4:
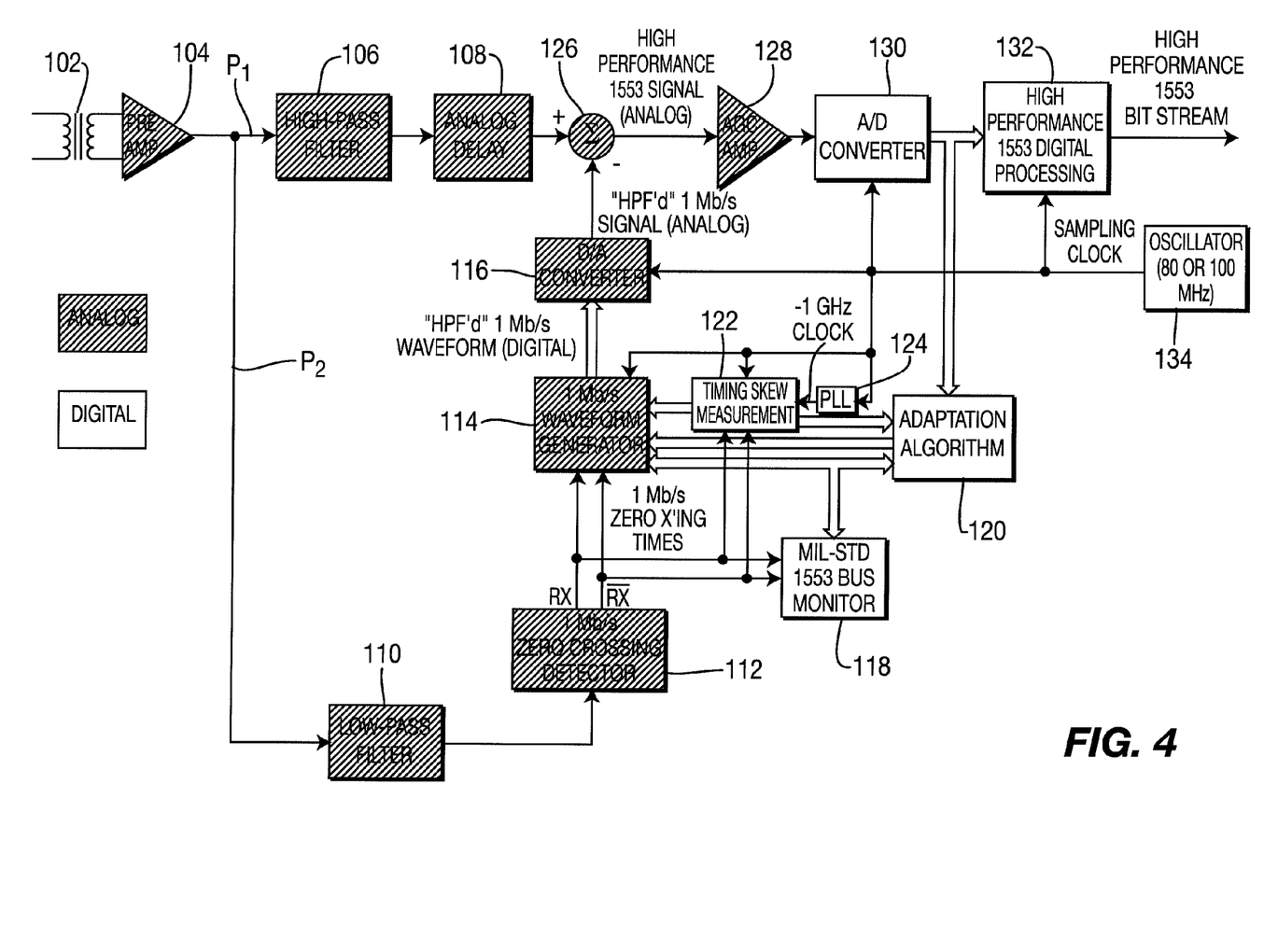
FIG. 4 is a simplified block diagram of a predictive cancellation circuit embodying the principles of the present invention and employing a combined analog/digital technique.

If the subtraction operation is performed in the analog domain, then the amplitude of the resultant difference signal can be controlled by means of an AGC (automatic gain control) circuit as shown in FIG. 4. This enables the receiver's A-to-D converter to digitize only the High Performance 1553 signal, rather than the composite signal, thereby reducing the dynamic range, and thus the resolution and accuracy requirements for the A-to-D converter. Subsequent digital processing after the A-to-D converter is then performed to extract the High Performance 1553 bit stream.

FIG. 4 shows the overall block diagram of the predictive cancellation circuit 100. As shown, while the circuit includes a mixture of analog and digital components, the actual subtraction of the synthesized 1 Mb/s 1553 signal from the composite input signal is performed in the analog domain.

Referring to FIG. 4, the transformer 102 and pre-amp 104 include an anti-aliasing low-pass analog filter and present a high impedance to the 1553 stub (note, for example, stub 16 in FIG. 1) while providing galvanic isolation. The transformer provides common mode rejection, and improves immunity for lightning disturbances and ESD.

High Pass Filter and Analog Delay

The path for the composite analog signal received at transformer 102 proceeds through high pass filter 106, followed by the analog delay. The high-pass filter pole(s) of approximately 4 MHz serve(s) to eliminate the low frequency components of the composite signal. In terms of the 1 Mb/s MIL-STD-1553 signal component, this reduces the overall signal level. Moreover, it eliminates low frequency "dynamic offset" effects from the 1 MHz 1553 signal resulting from transceiver and transformer imbalances. If not filtered out, the latter components, which can vary as function of message length, could create complications in the digital model for synthesizing the 1553 waveform. Further, note that a 4 MHz filter pole(s) is selected since there is no 4 MHz harmonic component of the 1 Mb/s 1553 signal.

The analog delay circuit provides a delay of approximately 2 microseconds. This delay is necessary to offset delays in the low pass filter 110, zero-crossing detector 112, 1 Mb/s waveform generator 114, and D/A converter 116.

1 Mb/s MIL-STD-1553 Receiver Circuit

Figure 5A:
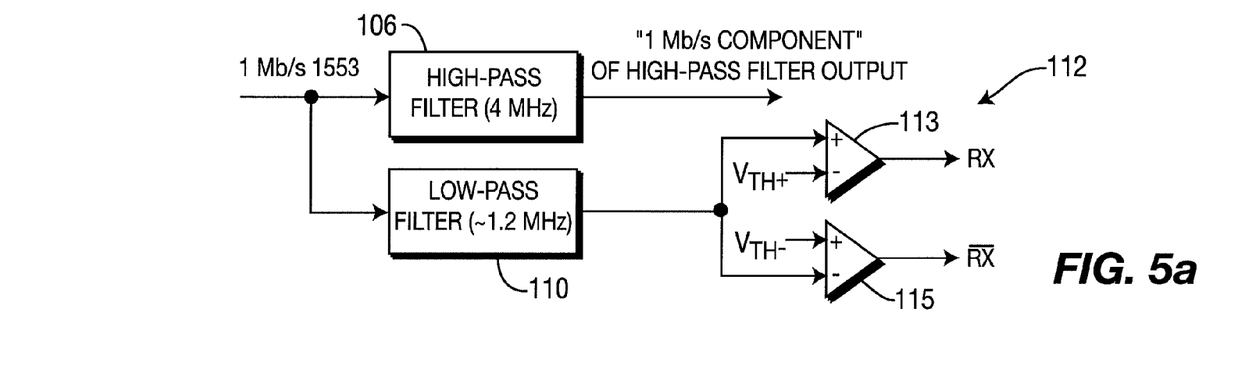
FIG. 5a is a simplified block diagram showing the high-pass and low-pass filters and a zero crossing detector circuit employed in the predictive cancellation circuit of FIG. 3.

FIG. 5a shows the operation of high pass filter 106, along with the combination of the low pass filter and 1 Mb/s zero-crossing detector 112. The low pass filter 110 and 1 Mb/s zero-crossing detector 112 comprise the elements of a conventional MIL-STD-1553 receiver circuit. The low pass filter provides a rolloff frequency of approximately 1.2 MHz to filter out extraneous noise and reduce the High Performance 1553 signal component to a very low level. Without this filtering, the High Performance 1553 signal could corrupt the operation of the 1 Mb/s zero-crossing detector.

Figure 5B:
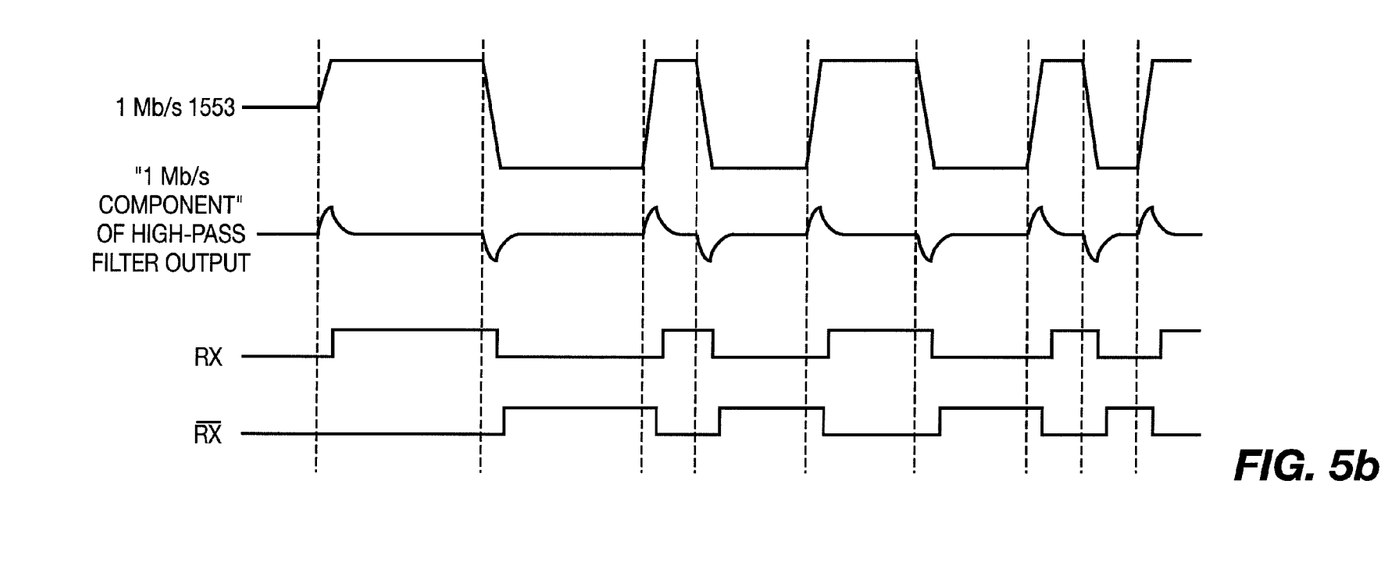

The 1 Mb/s zero-crossing detector 112 consists of a pair of comparator circuits 113, 115 which produce the complimentary, non-overlapping RX and RX* signals whose waveforms are shown in FIG. 5b. RX is asserted high when the low pass filtered version of the differential signal exceeds a positive threshold $V_{TH+}$, while RX* is asserted high when the same signal goes below a negative threshold $V_{TH-}$. The comparator thresholds reflect signal levels of +250 to +300 mV (500 to 600 mV peak-to-peak), based on the "raw" 1 Mb/s signal received by the isolation transformer.

FIG. 5b illustrates the timing relationship between the 1 Mb/s MIL-STD-1553 "raw" input signal, the output of the high-pass filter circuit, and the RX and RX* outputs of the zero-crossing detector circuit. As shown, the output of the high pass filter corresponding to the 1 Mb/s MIL-STD-1553 signal component will be positive-going pulses resulting from rising edges of the raw 1 Mb/s 1553 signal, and negative-going pulses resulting from falling edges of the raw 1 Mb/s 1553 signal. Since this signal represents the composite input, there may also be a High Performance 1553 signal "riding" on top of this waveform (not shown in FIG. 5b).

Circuit Delays

The RX and RX* comparator outputs are complimentary, non-overlapping signals. When no 1 Mb/s 1553 signal is received, these two signals will both assert logic '0'. Note the delay between the rising and falling edges of the "raw" 1 Mb/s signal and the rising edges of RX and RX* respectively. This delay is attributable to: (1) delays resulting from the low pass filter 110; (2) delays resulting from the filter output attaining comparator threshold voltage; and (3) comparator circuit delays.

The purpose of the analog delay in the composite signal path is to intentionally overcompensate for these delays, along with those introduced by the 1 Mb/s waveform generator 114 and D/A converter 116. A part of the function of the circuit's adaptation algorithm is to determine these delays precisely and compensate by providing a digital delay to equalize the "arrival times" for the composite analog signal and the D/A converter output representing the reconstructed 1 Mb/s 1553 signal.

1 Mb/s Waveform Generator and MIL-STD-1553 Bus Monitor

The purpose of the 1 Mb/s waveform generator 114 is to perform real time digital reconstruction of the high pass filtered version of the 1 Mb/s MIL-STD-1553 component of the received signal. The synthesis needs to simulate all of the effects of the 1553 transmitter and transmission channel (cable and couplers); along with the isolation transformer 102, pre-amp 104, high pass filter 106, and analog delay circuit 108. The digitally synthesized signal is converted to analog form, enabling the 1 Mb/s component to be cancelled from the high pass filtered version of the composite received waveform.

The 1 Mb/s waveform generator 114 synthesizes digital representations of the positive and negative pulses, along with any other high frequency (>4 MHz) anomalies in the 1 Mb/s 1553 waveform. The starting points of these pulses are respectively triggered by the rising edges of the RX and RX* signals. As a means of providing further filtering against extraneous noise, during times when the 1 Mb/s 1553 input is determined to be in its "dead bus" condition (i.e. RX=RX*='0' for a period greater then 2 microseconds), "stray" pulses on RX that are less than 1 microsecond wide, along with all pulses on RX*, are ignored.

The MIL-STD-1553 bus monitor 118 works in close conjunction with the 1 Mb/s waveform generator 114. In order to faithfully reconstruct the incoming 1 Mb/s signal component, the waveform generator is "informed" of several parameters relating to the incoming 1 Mb/s 1553 signal. These include:

(1) The identity of the 1 Mb/s MIL-STD-1553 terminal (BC or RT) that is currently transmitting.

(2) The position (word/bits) within the current terminal's 1553 message transmission.

(3) Values of prior Manchester half-bits and sync types.

(4) Identifying different types of 1 Mb/s signal transitions. These include 'Dead Time'-to-'1', '1'-to-'0', '0'-to-'1', '1'-to-'Dead Time'. In particular, the last two need to be identified, since the resulting pulses for these can be markedly different than for the other cases, due to various effects.

Timing Skew

Figure 6:
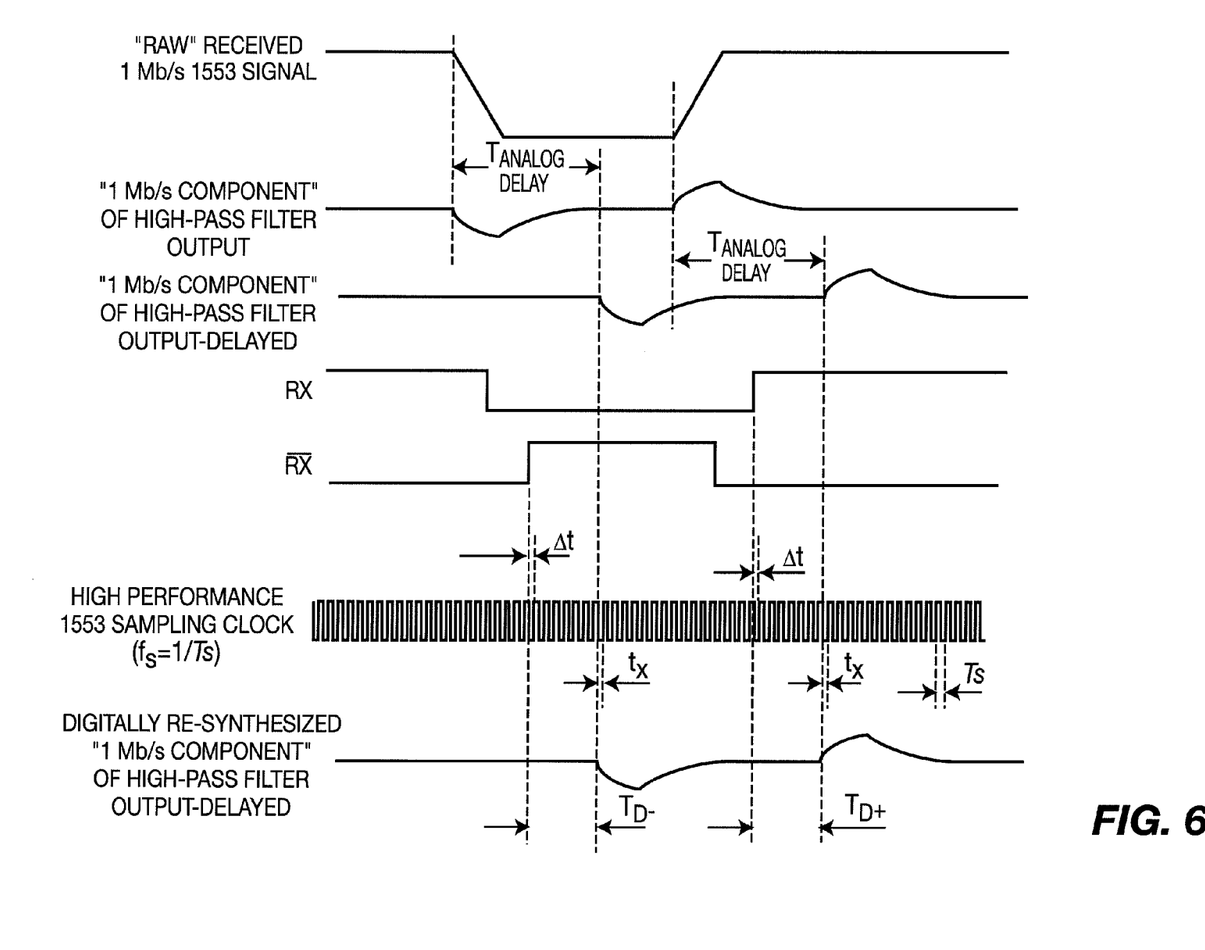
FIG. 6 shows waveforms useful in describing the determination of a timing offset between transition of a 1 Mb/s signal and a High Performance 1553 sampling clock.

FIG. 6 illustrates the timing of various signals, including the "raw" 1 Mb/s 1553 component of the composite received waveform, the high pass filtered and delayed high pass filtered versions of this signal, the RX and RX* digital outputs of the zero-crossing detector circuit, the High Performance 1553 sampling clock provided by oscillator 134 shown in FIG. 4, and the reconstructed high pass filtered version of the 1 Mb/s 1553 waveform.

$T_{D-}$ and $T_{D+}$ are digitally determined time delays for the reconstructed signal. $T_{D-}$ is the delay time from the rising edge of RX* to the start of negative pulses for the reconstructed 1 Mb/s waveform, while $T_{D+}$ is the delay time from of the rising edge of RX to the start of the reconstructed 1 Mb/s waveform.

The function of the $T_{D-}$ and $T_{D+}$ delays is to augment the time delays from the low pass filter, comparator circuits, and 1 Mb/s waveform generator in order to equalize the time delays of the high pass filter 106 (which should be minimal)

and the time delay due to the analog delay circuit 108. The values of these delay times are critical in order to eliminate any time skew between the two signal paths $P_1$ and $P_2$ (see FIG. 4). The values of $T_{D-}$ and $T_{D+}$, which are determined as part of the adaptation algorithm 120, are constant within the reception time of any 1 Mb/s MIL-STD-1553 message that is concurrent with reception of High Performance 1553 activity.

The variable $\Delta t$ is measured following each rising edge of RX and RX*. This time represents the delay from the rising edge of RX* or RX to the next rising edge of the High Performance 1553 sampling clock. This time is measured with a resolution of approximately 1 nanosecond by means of a clock with a frequency on the order of 1 GHz obtained at the output of the phase-locked loop (PLL) 124. Similar to $T_{D+}$ and $T_{D-}$, this time delay determination is critical in order to minimize errors in the reconstructed waveform resulting from timing skew.

For example, assuming a pulse with rise time of 150 nanoseconds, an amplitude of 2.5 volts, and a 100 MHz sampling clock, timing skew could introduce a voltage error=2.5V*(10 nS/150 nS)=0.17 volts. Since the received High Performance 1553 signal amplitude can be on the order of tens of millivolts, a voltage discrepancy of this magnitude would represent a significant source of error.

Synthesis of 1 Mb/s Signal

During periods of concurrent reception (i.e., 1 Mb/s and High Performance 1553), the generation of the 1 Mb/s waveform is based on a stored digital model developed by the adaptation logic circuitry 120. The goal is to synthesize the 1 Mb/s signal component of the delayed output from the analog high pass filter as accurately as possible. During reception of a 1 Mb/s signal, this circuit block outputs a digitized waveform symbol every N*500 nanoseconds, where N=1, 2, 3, or 4. The generation of each symbol is initiated by a rising edge of the 1 Mb/s zero-crossing detector outputs RX and RX*.

The 1 Mb/s generator output is updated on each cycle of the High Performance 1553 sampling clock 134, which is in the range of 80 to 100 MHz. The synthesis of each positive 2 Mbaud symbol of the 1 Mb/s waveform begins on the first sampling clock following a delay of $T_{D-}$ after the rising edge of RX. Similarly, the synthesis of each negative 2 Mbaud symbol begins on the first sampling clock following a delay of $T_{D+}$ after the rising edge of RX*. In terms of the High Performance 1553 sampling clock period $T_S$, the first output sample from the 1 Mb/s generator for a given symbol will occur on the $(I+2)^{nd}$ clock edge following the rising edge of RX or RX*, where I is computed by equation [3]. In this equation, the "Int" function rounds the indicated quotient down to the next lowest integer.

$$I = \text{Int}\left(\frac{(T_{D+(-)} - \Delta t)}{a \cdot T_s}\right) \quad [3]$$

While $T_{D+(-)}$ and $T_s$ are fixed values, $\Delta t$ is measured at the beginning of each received 1 Mb/s 1553 symbol, where a symbol is either a half-sync, a half-sync followed by a Manchester half-bit, 1 or 2 Manchester half-bits, a Manchester half-bit followed by a half-sync, or a '1' (or '0')-to-dead time transition. Depending on the current value of $\Delta t$ for a given symbol ($\Delta t$ must be less than $T_s$), the variable I can only assume one of two values: Int $(T_{D+(-)}/T_s)$ or Int $(T_{D+(-)}/T_s)-1$.

Since the 1 Mb/s 1553 Clock is not synchronous with the High Performance 1553 sampling clock, the first High Performance 1553 sampling clock of a given symbol will occur sometime after the actual starting time of the symbol. The value of this offset time $t_x$, which is shown in FIG. 6, is defined by equation [4].

$$t_x = (I+1)*T_s + \Delta t - T_{D+(-)} \quad [4]$$

where I is given by equation [3].

Since "sample #0" of the current 1 Mb/s symbol occurs at time $t_x$ within the symbol time, then the time of an arbitrary "$N^{th}$" sample within the symbol is given by equation [5].

$$t_N = (N*T_s) + t_x \quad [5]$$

For each 2 Mbaud symbol, the value of the synthesized output for each cycle of the High Performance 1553 sampling clock is determined by means of a curve fitting algorithm. This algorithm is based on a set of stored coefficients, which are determined by the adaptation algorithm during power-up initialization, and also subsequently updated by the adaptation algorithm during periods when a 1 MHz 1553 signal is present, and the High Performance 1553 signal is absent.

Use of the High Performance 1553 sampling clock 134 to generate the re-synthesized 1 Mb/s 1553 waveform provides two advantages:

Since the frequency of this clock is in the range of 80 to 100 MHz, this allows synthesis of odd harmonics of the 1 Mb/s signal up to 39 to 49 MHz, with the latter harmonics respectively requiring Nyquist frequencies of 78 MHz and 98 MHz Extending the bandwidth of the predictive cancellation signal serves to maximize the usable signal bandwidth of the High Performance 1553 signal.

Updating the value of the synthesized signal using the High Performance 1553 sampling clock 134 enables the component of the A/D converter's input that is dependent on the D/A converter output to remain stable during the sampling time of the A/D converter's track-and-hold circuit. This is necessary in order to minimize conversion errors.

D/A Converter and Analog Subtraction Circuit

Referring again to FIG. 4, the digital output of the 1 Mb/s signal generator is then converted back to an analog signal by the D/A converter 116. As shown in FIG. 6, the intent is for the timing and shaping of this signal to duplicate as faithfully as possible that of the 1 Mb/s 1553 component of the high-pass filtered and delayed version of the received composite signal.

The re-synthesized 1 Mb/s 1553 signal is then removed from the composite signal by means of the analog subtraction circuit 126. The intent of this subtraction is to eliminate as much of the 1 Mb/s 1553 signal component as possible from the analog signal passed to the High Performance 1553 receiver circuit.

While the received 1 Mb/s 1553 signal is in the range of volts (e.g., 3 to 5.5 volts peak-to-peak on the stub is typical), the received High Performance 1553 signal level is typically in the range of tens of millivolts. The principal goal of the cancellation operation is to reduce the residual 1 Mb/s 1553 signal level to the tens of millivolts or millivolts range, thereby providing an improvement in signal-to-noise ratio on the order of 40 to 60 dB, without entailing a significant reduction in usable High Performance 1553 bandwidth. Another benefit of the subtraction operation is that by reducing the overall amplitude of the composite signal, it allows the High Performance 1553's ACG amplifier to operate with a higher gain, thereby improving the effective resolution and accuracy of the High Performance 1553 A/D converter 130.

Adaptation Algorithm

As part of system start-up, as well as during times of operation when only a 1 Mb/s MIL-STD-1553 signal is present and no High Performance 1553 signal is received, the adaptation algorithm updates the model for generating 1 Mb/s waveform symbols. During these times, the adaptation algorithm works in conjunction with: 1 Mb/s waveform generator 114, MIL-STD-1553 bus monitor 118, timing skew measurement circuit 122, D/A converter 116, analog subtraction circuit 126, AGC amplifier 128, and High Performance 1553 A/D converter 130.

In one mode, the adaptation logic operates in an open loop adaptation mode in order to develop an initial model of the 1 Mb/s 1553 signal received from the various 1553 terminals on the bus. In this mode, which is invoked during power-up initialization, the 1 Mb/s waveform generator 114 is not activated, while the gain of the High Performance 1553 ACG amplifier 128 is set to a minimum value.

By so doing, the 1553 bus operates in a mode in which 1 Mb/s MIL-STD-1553 subaddress 30 wraparound messages are sent to all remote terminals (RTs) on the bus 18 (see FIG. 1) by means of broadcast commands. These broadcast messages may be sent either by the system's 1553 bus controller (BC), or by one of the High Performance 1553 terminals operating in a "MIL-STD-1553 BC" mode.

The wraparound messages preferably include variable data word counts (1, 2, 4, 8, 16, and 32 data words) and include pseudo-random data patterns. If the broadcast wraparound message is sent by the system bus controller, this message should be monitored by the High Performance 1553 terminals on the bus 18, as part of the open loop adaptation procedure.

As part of a subsequent step of this initialization, the bus controller (BC) then commands each RT to transmit the data words that it received on subaddress 30. This transmission is monitored by all High Performance 1553 terminals on the bus for the purpose of initiating performance of their open loop adaptation procedure.

In the open loop adaptation mode, the High Performance 1553 terminals receive the 1553 signals from each transmitting RT (and possibly the 1553 BC) and digitize the received signal for the purpose of developing an initial model of the received waveform. From the digitized waveform, the adaptation logic determines the arrays of coefficients for modeling of the pulses resulting from positive and negative transitions of the "raw" received 1553 signal.

The modeling takes into account values of prior Manchester half-bits and sync types, and all types of 1 Mb/s 1553 signal transitions: 'dead time'-to-'1', '1'-to-'0', '0'-to-'1', '1'-to-'dead time', and '0'-to-'dead time'. The wave shape of the last two types is likely to vary significantly as a function of transmitted message length. This information is incorporated into the waveform synthesizing model.

After the High Performance 1553 terminals have developed their initial models of the 1 Mb/s waveforms received from each terminal, they then switch from their open loop adaptation mode to their closed loop adaptation mode.

In the closed loop adaptation mode, the overall circuit operates in a "control system" configuration with the goal of nulling out the output of the analog subtraction circuit (and thus the A/D converter) while a 1 Mb/s 1553 signal, but no High Performance 1553 signal, is being received. In this mode, the output of the analog subtraction circuit 126 is amplified at 128, digitized and monitored by the adaptation logic 120. The intent of this mode is to determinate the values of the $T_{D+}$ and $T_{D-}$ time delay parameters, and make further adjustments in the 1 Mb/s 1553 signal models in order to account for the characteristics of the low pass filter, 1 Mb/s zero-crossing detector circuit 112, 1 Mb/s waveform generator 114, A/D converter 130, and analog subtraction circuit 126.

The first operation that needs to be performed in the closed loop adaptation mode is the determination of the $T_{D+}$ and $T_{D-}$ time delay parameters. Coming out of the open loop mode, the initial estimate of $T_{D+}$ and $T_{D-}$ will be a value less that the nominal value of the analog time delay. After the precise values of $T_{D+}$ and $T_{D-}$ have been determined, the output of the subtraction circuit should be near null. At this time, the adaptation algorithm proceeds to adjust its coefficient values to their optimal values in order to drive the difference signal to as close to zero as possible.

After initialization time, the cancellation circuit remains in its closed loop mode. Within this operation, there are three different modes of operation:

When a High Performance 1553 signal is being received, but no 1 Mb/s 1553 signal is being received, the composite signal passes through the high-pass filter 106 and analog delay circuit 108; no subtraction operation is required.

When both the 1 Mb/s 1553 and High Performance 1553 signals are received, the operation of the cancellation circuit blocks is activated, while the adaptation algorithm is deactivated; i.e., $T_{D+}$, $T_{D-}$, and the waveform synthesizer coefficients are not updated at this time.

During times when a 1 Mb/s 1553 signal is being received but no High Performance 1553 signal is being received, the adaptation algorithm is again activated. This allows the values of $T_{D+}$ and $T_{D-}$, along with the waveform synthesizer coefficients for a particular 1 Mb/s 1553 terminal(s) to be updated. This updating is necessary to compensate for various parameter drifts resulting from time, temperature, and other effects.

For a particular system, if the scheduling of 1 Mb/s 1553 and High Performance 1553 messages does not allow for "online adaptation" as described above, the open and closed loop adaptation procedures performed during power-up initialization may be repeated.

Digital Subtraction Method

Figure 7:
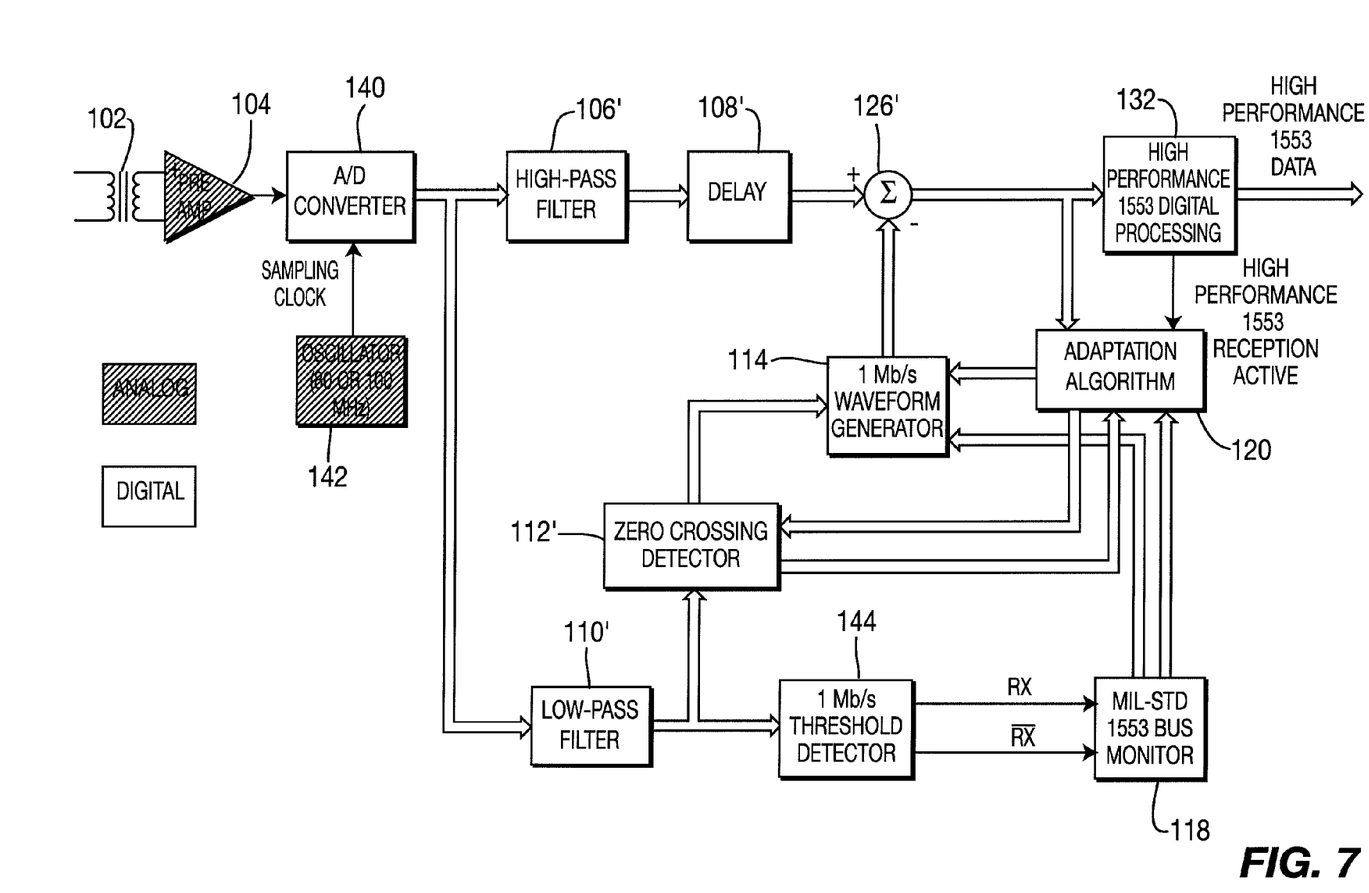
FIG. 7 is a simplified block diagram of a predictive cancellation circuit employing an all digital technique for predictive cancellation.

For the digital subtraction method, FIG. 7 shows the overall block diagram for implementing the predictive signal cancellation, wherein like elements are designated by like numerals in FIGS. 4 and 7 and modified elements are designated by "primes." As shown, beyond the pre-amp 104 and A-to-D converter 140, all signal processing is performed in the digital domain, including the operation of subtracting the re-synthesized 1 Mb/s 1 Mb/s 1553 waveform from the composite input signal.

Referring to FIG. 7, transformer 102 and pre-amp 104 include an analog anti-aliasing, low-pass filter and present a high impedance to the 1553 stub while providing galvanic isolation. The transformer provides common mode rejection, and improves immunity for lightning disturbances and ESD. Note that unlike the analog signal subtraction technique, the digital technique does not require an AGC (automatic gain control) amplifier, since the incoming composite signal will sometimes include a 1 Mb/s 1553 component. Unlike a "pure" High Performance 1553 signal, an incoming signal that includes a 1 Mb/s 1553 component will not vary in amplitude by more than about one order of magnitude. The A/D converter 140 converts the received analog signal to digital form. Oscillator 142, having an operating frequency in the range of 80-100 MHz, provides sampling clock pulses to A/D converter 140. The digitized output is fed to high pass digital filter 106' in path P1 and low pass digital filter 110' in path P2.

Digital High-Pass Filter and Delay

The path for the composite digitized signal proceeds through the high pass digital filter 106', followed by the digital delay 108'. The high-pass filter poles of approximately 4 MHz serve to eliminate the low frequency components of the composite signal. In addition to eliminating most of the 1 Mb/s 1553 signal, this also eliminates low frequency "dynamic offset" affects from the 1 MHz 1553 signal resulting from transceiver and transformer imbalances. If not filtered out, the latter components, which can vary as a function of message length, could create complications in the digital model for synthesizing the 1553 waveform. Further, note that a 4 MHz filter pole(s) is selected since there is no 4 MHz harmonic component of the 1 Mb/s 1553 signal.

The digital delay circuit 108' provides a delay of approximately 2 μS. This delay is necessary in order to equalize the delays in the digital low pass filter 110', zero-crossing detector 112', and 1 Mb/s waveform generator 114 digital processing operations.

Zero-Crossing Detector

The parallel digital output of digital, low-pass filter 110' provides the input to the zero-crossing detector 112', which monitors the filtered and digitized 1 Mb/s 1553 waveform for the purpose of determining: (1) departures from 0 volts ("dead bus" condition) at the start of reception of a 1553 message segment; and (2) the times of zero-crossing transitions; that is, when the filtered voltage transitions from a positive voltage to a negative voltage, or from a negative voltage to a positive voltage.

In addition to detecting the departures from zero and zero crossings, the zero-crossing detector 112' also provides indications of the time following the most recent A-to-D converter sampling time for each such transition. This time is provided as a fraction of the sampling period, $T_s$. The calculation to determine this is performed by means of an interpolation based on the value of the first sampled filtered voltage following each departure from zero or zero-crossing. As shown in FIG. 7, the factor relating the measured voltage to this time is provided from the adaptation algorithm logic 120. This scaling factor varies as a function of the specific 1 Mb/s 1553 BC or RT terminal that is currently transmitting, and in general is different for departures from zero, positive-to-negative voltage transitions, and negative-to-positive voltage transitions.

This relationship is defined by equation [6], where $t_0$=the estimate of the time from the most recent departure from zero or zero-crossing of the filtered voltage to the time of the first A-to-D converter sampling following that departure or crossing; $K_N$=the specific scaling factor provided by the adaptation logic, which has units of nS/volt; and $V_0$ is the value of the first sampled filtered voltage following the departure from zero or zero crossing.

$$t_0 = K_N * V_0 \quad [6]$$

1 Mb/s Waveform Generator

The output from the zero-crossing detector 112' provides the input to the 1 Mb/s waveform generator 114 (this same information is also provided to the adaptation algorithm block).

For the analog subtraction method, the time delays associated with the analog high-pass filter and analog delay are not tightly defined, and will vary as functions of temperature and circuit aging. For the digital subtraction method, the time delays associated with the digital high-pass filter and digital delay are much more tightly defined, and should not vary by more than a sampling clock period $T_S$.

That is, with the digital subtraction method, the total number of sampling clock cycles associated with the high-pass filter 106' and digital delay 108' for the composite signal will be identical to the total number of clock cycles associated with the low-pass filter 110', zero-crossing detector 112', and 1 Mb/s waveform generator 114. This equalization of time delays (number of clock cycles) is necessary for the proper operation of the digital subtraction block 126'.

Similar to the operations performed using the analog subtraction method, during the reception of a 1 Mb/s 1553 signal, the 1 Mb/s waveform generator processor 114 outputs a digitized waveform symbol (reference FIG. 6) every N*500 nS, where N=1, 2, 3, or 4. The generation of each such symbol is initiated by the indication of a departure from zero volts, positive-to-negative transition, or negative-to-positive transition from the zero-crossing detection block. The symbol synthesis algorithm takes into account the value of to provided by the zero-crossing detection block for each departure or transition, along with the coefficients provided by the adaptation processing block, which (similar to the analog subtraction method) are functions of the transmitting terminal and type of voltage transition.

Digital Subtraction Operation

The output of the 1 Mb/s waveform generator 114 will be a high-pass filtered version of the 1 Mb/s 1553 component (but not including the High Performance 1553 component) of the digitized composite input signal. The equalization of delay times for the composite signal and the re-synthesized 1 Mb/s 1553 signal allows the re-synthesized 1 Mb/s signal to be digitally subtracted from the composite digital signal. The resulting difference signal represents the High Performance 1553 signal, thereby providing the input to the High Performance 1553 digital processing block 132.

Low-Pass Filter and Threshold Detection Circuit

The operation of the low-pass digital filter 110' and 1 Mb/s threshold detector 144 is similar to that of a conventional MIL-STD-1553 receiver circuit. The digital low pass filter provides a rolloff frequency of approximately 1.2 MHz to filter out extraneous noise, and reduce the High Performance 1553 signal component to a very low level. Without this filtering, the High Performance 1553 signal could result in errors for the zero-crossing times for the 1 Mb/s waveform generation logic and/or corrupt the operation of the 1 Mb/s threshold detector 144, which could result in errors from the 1553 bus monitor.

The 1 Mb/s threshold detector 144 provides the RX and RX* inputs to the MIL-STD-1553 bus monitor logic. In operation, when the digitized differential voltage (output of the low-pass filter) is less than $\pm V_{TH}$, the outputs RX and RX*='0'; when the differential voltage is $>V_{TH}$, output RX='1' and RX*='0'; and when the differential voltage is $<-V_{TH}$, output RX*='1' and RX='0'. $V_{TH}$ will be approximately 0.25 to 0.3 volts, reflecting a 1 Mb/s 1553 receiver threshold of 0.5 to 0.6 volts peak-to-peak, based on the "raw" 1 Mb/s signal received by the isolation transformer.

MIL-STD-1553 Bus Monitor

For the digital subtraction method, the operation of the MIL-STD-1553 Bus Monitor 118 is identical to that for the analog subtraction method of FIG. 4. Monitor 118 determines when there is 1 Mb/s 1553 activity, and if so which 1553 BC or RT terminal is transmitting. This block also determines the (correct) time delineating the end of a BC or RT terminal's 1553 transmission. These indications are provided to the adaptation algorithm 120 and 1 Mb/s waveform generator 114.

Adaptation Algorithm

For the digital subtraction method, the operation of the adaptation algorithm block is very similar to that for the analog subtraction method. During periods of 1 Mb/s 1553 reception when no High Performance 1553 message is present, reception as determined by the MIL-STD-1553 bus monitor 118 and the value of the High Performance 1553 Reception Active signal, bus monitor 118 monitors its inputs from the output digital subtraction logic, along with those from the MIL-STD-1553 bus monitor and the zero-crossing detector 112'. During these times, it updates the respective waveform synthesis coefficients provided to the 1 Mb/s waveform generator 114, along with the values of the various '$K_N$' scaling factors provided to the zero-crossing detector 112'. During these times, the updating process drives the output of the subtraction block 126' to zero.

During simultaneous reception of 1 Mb/s 1553 activity and High Performance 1553 activity, the adaptation block 120 does not update the waveform synthesis coefficients or the '$K_N$' scaling factors. However, at these times, it continues to provide the respective waveform synthesis coefficients to the 1 Mb/s waveform generator 114, along with the values of the '$K_N$' scaling factors to the zero-crossing detector block.

The invention claimed is:

1. Apparatus for synthesizing a first analog signal for use in the analysis of a second analog signal combined with said first signal, said second signal being a higher frequency than said first signal, comprising:
   a unit for receiving said combined signals;
   first and second output lines coupled to an output of said receiving unit;
   a high pass filter coupled to said first output line for passing said composite signals and filtering out harmonics of said second signal;
   a low pass filter coupled to said second output line for filtering out the second signal;
   a summing circuit having first and second inputs;
   a delay circuit coupling an output of said high pass filter to said first input of said summing circuit;
   a zero-crossing detector coupled to an output of said low pass filter for detecting zero crossings in a positive and negative going direction of a signal passed by said low pass filter;
   a generator responsive to non-inverted and inverted outputs of the zero-crossing detector for generating a digital representation of a version of said first signal passing said low pass filter;
   a unit for adjusting the digital representation to compensate for a timing skew between said signals in said first and second lines so that the signals in said first and second lines are in time synchronism when they reach said summing circuit;
   a D/A converter for converting the digital representation of said first signal to an analog signal; and
   said summing circuit canceling the analog signal generated by the D/A converter from the output of said high pass filter.

2. The apparatus of claim 1 further comprising a unit for analyzing an output of said summing circuit.

3. The apparatus of claim 1 further comprising a unit for storing the digital representation of said first signal outputted by said generator for use in subsequent cancellations.

4. The apparatus of claim 1 wherein said generator is configured to generate a digital output every N×500 nanoseconds, where N=1, 2, 3, or 4, responsive to each rising edge of a zero crossing detector output from a zero-crossing detector which monitors the output of the low pass filter.

5. The apparatus of claim 1 wherein the first signal provides data at a rate of 1 Mb/sec.

6. The apparatus of claim 5 further comprising a sampling clock having an operating frequency in the range of 80 to 100 MHz for synchronizing operation of said generator.

7. The apparatus of claim 1 further comprising:
   an A/D converter for converting the output of said summing circuit into a digital format.

8. The apparatus of claim 7 further comprising a processor for extracting data from the output of said A/D converter.

9. The apparatus of claim 8 wherein said processor is a digital signal processor (DSP).

10. The apparatus of claim 1, further comprising:
    an updating circuit for updating the synthesized first signal;
    a monitor for monitoring incoming signals to activate said updating circuit when only said first signal is present;
    said updating circuit generating a model for the synthesized signal when activated by said monitor; and
    an automatic gain control amplifier coupled between said summing circuit and said A/D converter, being operative for normal operation when both of said first and second signals are received and being maintained at a minimum gain when only said first signal is present.

11. The apparatus of claim 10, further comprising:
    a sampling clock for providing sampling pulses to said generator and second converter for generating symbols at a rate controlled by said sampling clock.

12. The apparatus of claim 11 wherein said sampling clock generates sampling pulses at a rate greater than the frequency of said second signal.

13. The apparatus of claim 12 wherein the first signal has an operating frequency of 1 MHz, said second signal has an operating frequency in the range 8-20 MHz.

14. The apparatus of claim 13 wherein said sampling clock generates pulses at a rate in the range of 80-100 MHz.

15. The apparatus of claim 10 wherein said updating circuit comprises:
    a unit for generating coefficients from a first signal received from a remote transmitter for modeling pulses obtained from positive and negative transitions of the received first signal to obtain an initial model of said first signal;
    a unit responsive to obtaining said initial model of said first signal for initiating a closed-loop mode, to subtract the initial model of the first signal from the output of said delay circuit;
    said updating circuit adjusting said coefficients responsive to a difference signal generated at the output of said second converter to null said difference signal; and
    a storing unit for storing said coefficients.

16. The apparatus of claim 15 wherein said updating circuit further comprises:
    a unit responsive to the simultaneous presence of said first and second signals for applying the synthesized signal to the generator to cancel the synthesized signal from the combined first and second signals passed by said delay circuit.

17. The apparatus of claim 10 wherein said updating circuit generates a synthesized signal which simulates a first signal passing said delay circuit with said second signal.

18. The apparatus of claim 11 wherein the updating circuit further comprises a timing skew measurement circuit; and
    a phase-locked loop coupled to said sampling clock for generating a clock pulse;
    said timing skew measurement circuit determining the time delay between rising edges of outputs of the zero-crossing detection circuit at a next rising edge of a pulse from said sampling clock.

19. A method for canceling out one of first and second data carrying signals transmitted as a combined signal to a receiver, said second signal having a frequency greater than said first signal, comprising:
    transferring the combined signals received to first and second paths for further processing;
    passing said first signal and filtering out said second signal from passing along said first path;

passing said combined first and second signals along said second path for further processing while filtering out harmonics of said second signal from passing along said second path;

transferring said first and second signals in said first path to a summing circuit after a given delay;

determining zero crossings of said first signal passed in said second path;

utilizing the zero crossings to generate a digital signal simulating the signal passed by said first path wherein rising edges of the zero crossings serve as starting points for digital representations of the positive and negative pulses, and responsive to: an identity of a terminal that is currently transmitted; a position of word/bits within a transmission of a current message from a terminal; values of prior Manchester half bits and sink types; and an identification of types of signal transitions;

adjusting time delays of the generated digital signal to eliminate any time skew between first signals in the first and second signal paths;

converting the generated digital signal into analog form;

subtracting the analog form of the digital signal from the combined first and second signals transferred from said first path; and converting a resulting difference signal into digital form.

20. The method of claim 19 further comprising:
obtaining data contained in said digital difference signal.

21. The method of claim 19 further comprising:
adjusting a timing skew of the generated digital signal when the difference signal is greater than a given threshold.

22. The method of claim 19 further comprising:
adjusting the generated digital signal by repeating the method steps of claim 19 to further reduce the difference signal.

23. The method of claim 19 further comprising:
digitally processing the digital difference signal to provide a data bit stream of data in the first frequency signal.

24. The method of claim 19 further comprising:
disabling the step of utilizing the zero crossing to generate a digital signal responsive to absence of said first signal being transmitted to said receiver.

25. The method of claim 19, further comprising:
measuring a time delay between a rising edge of a start of negative going zero crossing and a start of the generated digital signal and a time delay between a rising edge of a positive going zero crossing and a start of a positive pulse of the generated digital signal.

26. The method of claim 19, further comprising:
storing the generated digital signal for subsequent use.

27. A method for generating a predictive cancellation signal, comprising:
receiving a composite signal comprised of a first and a second data carrying signal, a frequency of said second signal being greater than a frequency of said first signal;

separating said first signal from said first and second signals;

detecting positive and negative zero crossings of the separated first signal to synthesize an estimate of said first signal; and subtracting the synthesized signal from said composite signal to recover said second signal.

28. Apparatus for synthesizing a first signal for use in the analysis of a composite signal comprised of a second signal combined with said first signal, said second signal having a higher frequency than said first signal, comprising:
a unit for receiving said combined signals in analog form;
an A/D converter for converting the combined signals;
first and second output lines coupled to an output of said AID converter;
a high pass filter coupled to said first output line for removing harmonics of the second signal;
a low pass filter coupled to said second output line for removing the second signal;
a summing circuit having first and second inputs;
a delay circuit coupling an output of said high pass filter to said first input of said summing circuit to synchronize arrival of the signals at said first and second inputs;
a zero-crossing detector coupled to an output of said low pass filter for detecting zero crossings in a positive and negative going direction of a signal passed by said low pass filter;
a generator for generating a digital output representation of said first signal responsive to said zero-crossing detector;
a circuit for adjusting the digital output of said generator to compensate for a timing skew between said signals in said first and second lines so that the signals in said first and second lines are in time synchronism when they reach said summing circuit; and
said summing circuit subtracting the output of said generator from said combined first and second signals.

29. The apparatus of claim 28, further comprising:
a digital memory for storing the generated digital signal for subsequent use.

30. The apparatus of claim 28, further comprising:
a digital signal processor (DSP) for retrieving data from said second signal.

* * * * *